United States Patent [19]

Caputo et al.

[11] 4,155,427

[45] May 22, 1979

[54] ELEVATOR SYSTEM

[75] Inventors: William R. Caputo, Wyckoff; John J. De Lorenzi, Washington Township, Warren County, both of N.J.

[73] Assignee: Westinghouse Electric Corp., Pittsburgh, Pa.

[21] Appl. No.: 748,255

[22] Filed: Dec. 6, 1976

[51] Int. Cl.² ............................................. B66B 5/02
[52] U.S. Cl. ............................................. 187/29 R
[58] Field of Search .................................... 187/29

[56] References Cited

U.S. PATENT DOCUMENTS 3,410,368  11/1968  Inuzuka ............................. 187/29
3,961,688  6/1976  Maynard ............................. 187/29

*Primary Examiner*—Robert K. Schaefer
*Assistant Examiner*—W. E. Duncanson, Jr.
*Attorney, Agent, or Firm*—D. R. Lackey

[57] ABSTRACT

An elevator system including an elevator car, a drive motor for the elevator car, a power supply for the drive motor which includes a three-phase source of alternating potential, and a monitor for the three-phase source. The monitor discriminates between a malfunction of the three-phase source which should initiate shutdown of the elevator system, and a momentary disturbance which should be ignored.

21 Claims, 7 Drawing Figures

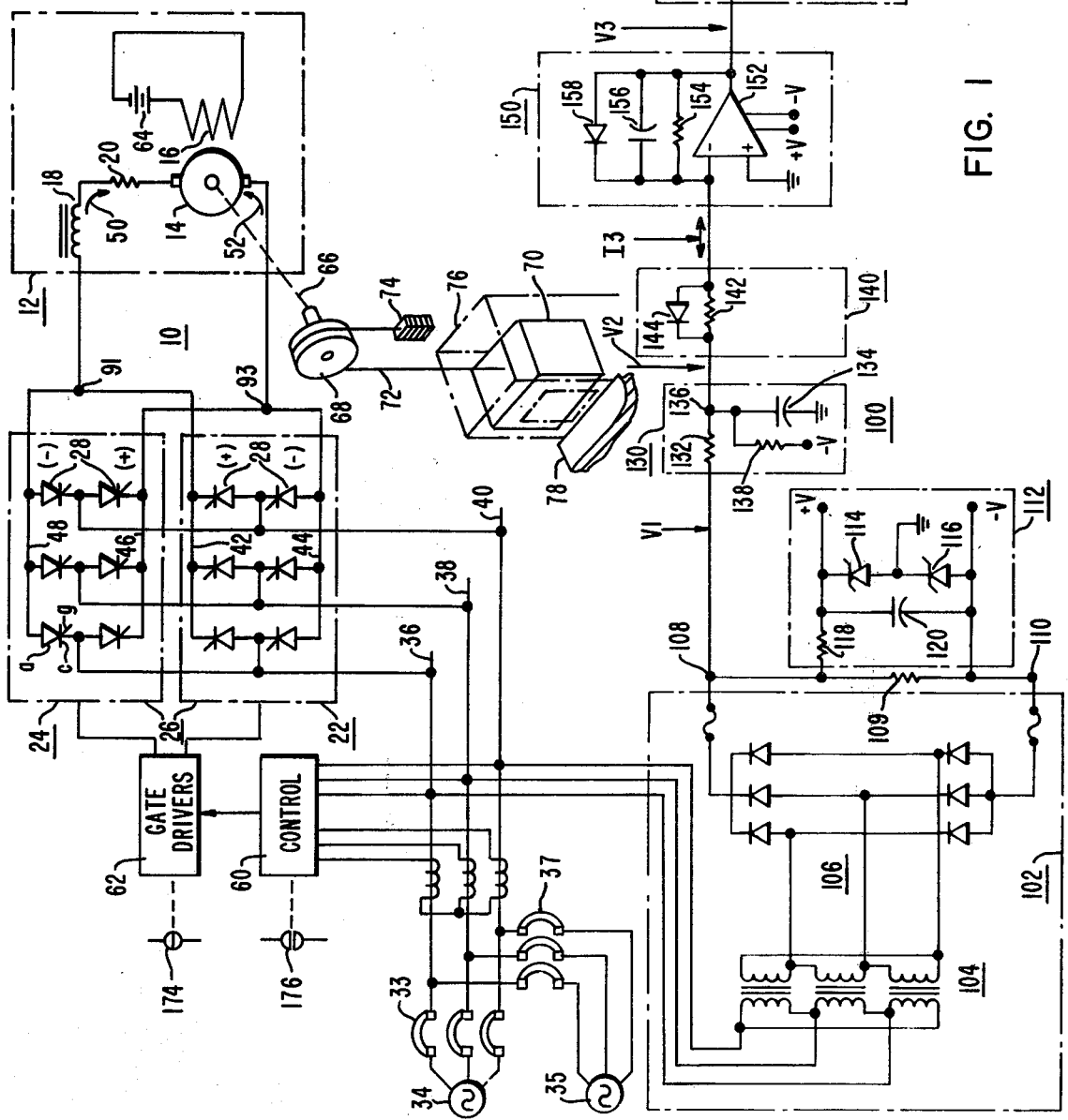
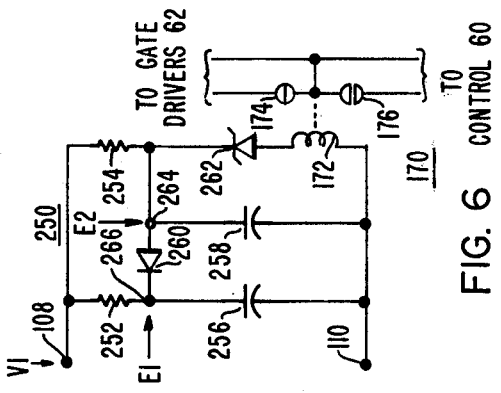
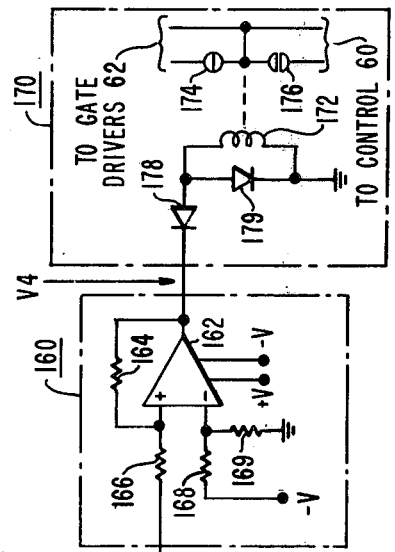
FIG. 6
FIG. 1

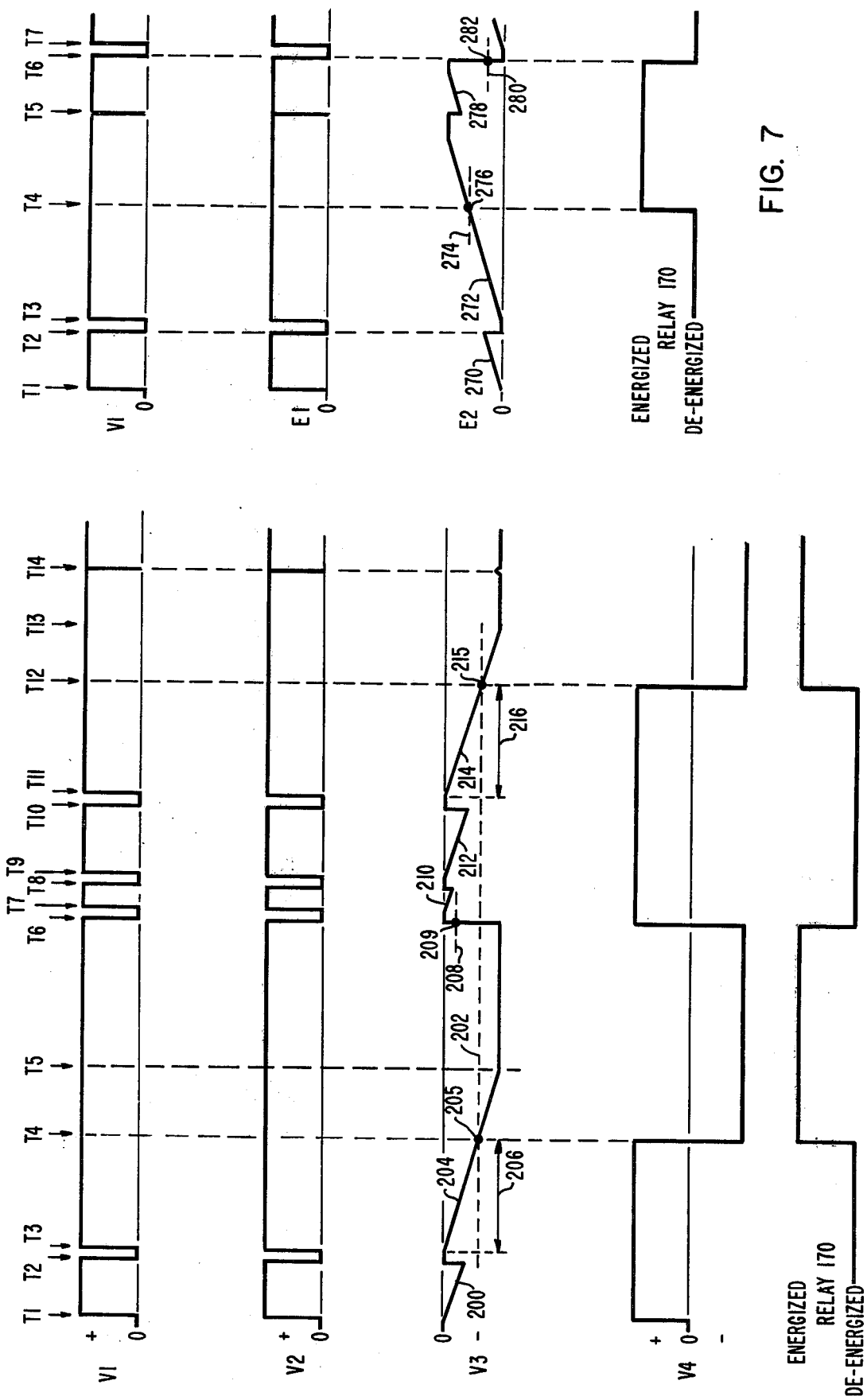

ELEVATOR SYSTEM

BACKGROUND OF THE INVENTION

1. Field of the Invention

The invention relates in general to elevator systems, and more specifically to elevator systems which include a power supply monitor.

2. Description of the Prior Art

Elevator systems are expected to operate satisfactorily under both normal and emergency power conditions, and to shut down when the power supply conditions are not suitable for elevator operation. If the elevator car is driven by a three-phase induction motor, it is important to detect the direction of phase rotation and single phasing of the source. U.S. Pat. No. 3,596,137, which is assigned to the same assignee as the present application, discloses a three-phase power supply monitor responsive to both the direction of phase rotation and single phasing.

When the elevator drive motor is a direct current motor, with the direct current voltage supplied by a motor-generator set, single phasing of the three-phase source applied to the A.C. drive motor of the motor-generator set is commonly detected by a monitor which measures the ripple component of the direct current output voltage provided by a three-phase full-wave bridge. If the magnitude of the ripple component exceeds a predetermined magnitude, a relay is energized which removes the associated elevator car from service. While this monitor is satisfactory on normal A.C. power, its operation on emergency A.C. power is marginal. If the distortion of the A.C. voltage waveform provided by an emergency power generator is severe, the harmonic content of the ripple component is increased and the relay will be falsely energized, preventing the elevator car from operating.

When the elevator drive motor is a direct current motor and the direct current voltage is provided by a solid state controlled bridge rectifier, commonly called a converter, the hereinbefore mentioned ripple component monitor becomes even more unreliable upon operation from an emergency power source. The combined effect of the emergency power voltage distortion and commutation notches from the solid state rectifier greatly increases the probability of false operation.

The solid state converter power supply for an elevator system also has a disadvantage when short power voltage disturbances occur, which disadvantage is not present when the direct current voltage is provided by a motor-generator set. The inertia of the rotating mass of a motor-generator set enables it to simply ride over short interruptions or other unimportant disturbances in the three-phase source. A solid state converter, on the other hand, cannot discriminate between those interruptions and disturbances which should be ignored, and those which require prompt action in order to prevent misfiring. For example, if the three-phase source for a dual bridge converter is interrupted while the elevator car is moving, and then the source, or an alternate source, reappears, the synchronization of the gate drive logic will have been lost, and the velocity error may call for opposite polarity current to that being supplied just prior to the outage. Thus, controlled rectifiers of one of the converter bridge circuits may be fired while those of the other converter bridge are conducting, and unless the two banks are split and four costly reactors provided, the fuses will be blown, resulting in stoppage of the elevator car without regard to floor level. The elevator car will remain in this position until the fuses are replaced.

Thus, in order to provide elevator operation under various power supply conditions, it would be desirable to have a three-phase monitor for the alternating potential portion of the power supply of the elevator system which has all of the following characteristics:

(1) It will detect single phasing of a three-phase full wave bridge rectified direct current power supply, (2) It will operate reliably under normal and emergency power conditions, (3) It will detect loss of the three-phase source, or any phase thereof, (4) It will operate with a high degree of immunity to voltage distortion and commutation notches caused by an emergency power generator and controlled rectifier apparatus, and (5) It will initiate an orderly shutdown or startup sequence for elevator drive apparatus, depending upon the condition of the power supply.

SUMMARY OF THE INVENTION

Briefly, the present invention is a new and improved elevator system, including an elevator car, motive means for the elevator car, power supply means for the motive means, including a three-phase source of alternating potential, and monitoring means for monitoring the three-phase source and for providing signals in response thereto which control the operation of the elevator car. The monitoring means includes rectifier means which provides a unidirectional signal responsive to the three-phase source, control means providing a control signal responsive to the magnitude of the unidirectional signal, and non-linear means for controlling the response of the timing means to the unidirectional signal, depending upon the magnitude of the unidirectional signal. The control signal is utilized by translating means which is operable between first and second conditions in response to first and second threshold levels, respectively, of the control signal. The first condition enables flow of energy between the power supply means and the motive means, while the second condition inhibits it. The non-linear means controls the response of the control means to the unidirectional signal by selecting the rate at which the control means responds to changes in the unidirectional signal, which in turn controls the time for the control signal to reach the first and second threshold levels. A first rate is selected when the unidirectional signal is above a predetermined magnitude, and a second rate is selected when the unidirectional signal is at and below the predetermined magnitude. The relationship between the rates is such that upon either an interruption in the three-phase source which persists for a predetermined short period of time, or single phasing, the magnitude of the control signal will be reduced to the second threshold level, while an interruption for less than the predetermined short period of time, and waveform distortions which are less severe than single phasing, are ignored. When an interruption in the three-phase source for the predetermined short period of time occurs, or upon single phasing of the three-phase source, the elevator car is stopped, and if a solid state converter is part of the power supply, firing signals for the converter are inhibited. The power supply is monitored following such orderly shutdown. If the three-phase source returns to normal for a predetermined relatively long period of time during which there are no interruptions which persist for the predetermined short period of time, the control signal rises to the first threshold level and an orderly startup of the elevator system is initiated.

BRIEF DESCRIPTION OF THE DRAWING

The invention may be better understood, and further advantages and uses thereof more readily apparent, when considered in view of the following detailed description of exemplary embodiments, taken with the accompanying drawings, in which:

FIG. 1 is a schematic diagram of an elevator system constructed according to the teachings of the invention;

FIGS. 2-5 are graphs which aid in the understanding of the operation of the elevator system shown in FIG. 1;

FIG. 6 is a schematic diagram of monitoring apparatus constructed according to another embodiment of the invention, which may be used in place of certain monitoring apparatus shown in FIG. 1; and FIG. 7 is a graph which aids in the understanding of the operation of the monitoring apparatus shown in FIG. 6.

DESCRIPTION OF PREFERRED EMBODIMENTS

Figure 4:
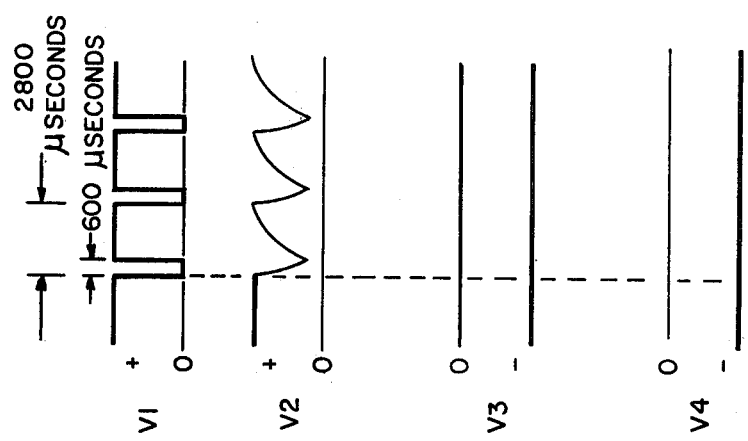

Referring now to the drawings, and FIG. 1 in particular, there is shown an elevator system 10 constructed according to the teachings of the invention. For purposes of example, elevator system 10 is illustrated as being of the electric traction type, which includes a direct current drive motor 12 having an armature 14 and a field winding 16, but the invention may be utilized with any elevator system having a power supply which includes a three-phase source of electrical potential. The invention is especially suitable for use in an elevator system having a direct current drive motor supplied from a solid state controlled rectifier converter, such as a dual bridge converter, and it will be described in this context.

More specifically, the armature 14 of the elevator drive motor 12 is electrically connected to an adjustable, static source of direct current potential which includes first and second converter banks 22 and 24, respectively, referred to collectively as a dual converter 26. Each of the converter banks 22 and 24 of the dual converter 26 may be a three-phase, full-wave bridge circuit, which includes a plurality of controlled rectifiers or thyristors 28, each having anode, cathode and gate electrodes a, c, and g, respectively, connected to interchange electrical power between alternating and direct current circuits. The alternating current circuit includes a source 34 of alternating potential, such as a three-phase, 60 hz. supply, a disconnect or circuit breaker 33 and electrical busses 36, 38 and 40. The alternating current circuit may also include an emergency source 35 of alternating potential, such as a gasoline or Diesel engine connected to drive an A.C. generator, which is automatically started and connected to the electrical busses 36, 38 and 40 via a circuit breaker 37, in response to failure of source 34.

The direct current circuit includes busses 42 and 44 to which the first converter bank 22 is connected, busses 46 and 48 to which the second converter bank 24 is connected, and output terminals 91 and 93. Busses 42 and 48 are connected to output terminal 91, and busses 44 and 46 are connected to output terminal 93.

The two converter banks 22 and 24 are connected in parallel opposition with their direct current output circuits being directly connected to the armature 14 of the drive motor 12.

The dual bridge converter 26 controls the magnitude of the direct current voltage applied to armature 14, by controlling the conduction or firing angle of the controlled rectifier devices, and it controls the direction of the direct current flow through the armature 14 by selectively operating the converter banks. The two converter banks are never operated simultaneously, as this would create a shortcircuit condition.

When converter bank 22 is operational, current flow is indicated by arrow 50, proceeding through the armature 14 from the output terminal 91 to output terminal 93. When converter bank 24 is operational, current flow is indicated by arrow 52, proceeding from output terminal 93 to output terminal 91. Thus, the direction of torque in armature 14 depends upon which of the two converter banks is operational, and the speed of rotation of the drive motor depends upon the firing angle of the controlled rectifiers. U.S. Pat. Nos. 3,713,011 and 3,713,012 illustrate dual converter apparatus suitable for an elevator application. U.S. Pat. No. 3,749,204 illustrates a servo control loop which may be used. U.S. Pat. No. 3,741,348 illustrates in detail elevator control which may be modified to stop the elevator car according to the teachings of the invention. These U.S. patents, which are assigned to the same assignee as the present application, are hereby incorporated by reference and it is thus sufficient to indicate the control generally at 60, and the gate drivers which are responsive to the control 60, at 62.

The field winding 16 of the drive motor 12 is connected to a source 64 of direct current voltage, represented by a battery in FIG. 1, but any suitable source, such as a single converter may be used.

The drive motor 12 includes a drive shaft 66, to which a traction sheave 68 is secured. An elevator car 70 is supported by steel ropes 72 which are reeved over the sheave 68 and connected to a counterweight 74. The elevator car 70 is disposed in a hoistway 76 of an associated building or structure for guided movement therein to serve a plurality of floors, such as floor 78.

The dual converter 26 has many advantages over the motor-generator set in providing an adjustable direct current voltage for the elevator drive machine, but it requires a different power supply monitor than used by the motor-generator set, if unnecessary shutdowns, misfiring and blown fuses are to be avoided.

FIG. 1 illustrates a power supply monitor 100 which is especially suitable for elevator systems in which a dual converter 26 supplies a controllable D.C. voltage from a three-phase source. Monitor 100 initiates an orderly startup by monitoring the elevator drive machine power supply, and after a first predetermined period of time, such as about ten seconds, during which there are no interruptions which exist for a second predetermined period of time, such as ten milliseconds, the elevator system is enabled to start. The power supply monitor 100 continues to monitor the power supply, ignoring harmless distortion and commutation notches while initiating a shutdown of the elevator car and an inhibit of the gate firing signals upon single phasing of the three-phase source, and upon an interruption in the power supply which persists for the selected ten milliseconds period. The power supply must then provide a normal potential for the first predetermined period of time with no interruptions as long as the second predetermined period of time, before the elevator car is allowed to restart. The power supply monitor 100 shown in FIG. 1 illustrates a first embodiment of the invention for providing these functions, and FIG. 6 illustrates a power supply monitor 250 constructed according to another embodiment of the invention for achieving these functions.

More specifically, the power supply monitor 100 of FIG. 1 requires a unidirectional signal responsive to the three-phase source of alternating potential connected to electrical busses 36, 38 and 40. The D.C. output of the rectifier for providing the normal 125 volt D.C. control voltage may be used as the unidirectional signal, or the power supply monitor 100 may include a rectifier 102 having a three-phase transformer 104, a three-phase, full-wave bridge rectifier 106, and a relatively low impedance load resistor 109 connected across the output of rectifier 106. In any event, the power supply monitor 100 requires a unidirectional signal responsive to the three-phase alternating potential on busses 36, 38 and 40 to be provided to terminals 108 and 110. The unidirectional voltage appearing across terminals 108 and 110 is referenced V1.

Suitable control voltages $+V$ and $-V$, such as $+15$ volts and $-15$ volts, respectively, may be provided for operating the control elements of the power supply monitor 100 by connecting an auxiliary control power supply 112 to terminals 108 and 110. The control power supply 112 may simply include first and second Zener diodes 114 and 116 serially connected between terminals $+V$ and 31 V, with their junction being grounded. Terminal 108 is connected to the cathode of Zener diode 114 via a resistor 118, and terminal 110 is connected to the anode of Zener diode 116. A capacitor 120 is connected from the cathode of Zener diode 114 to the anode of Zener diode 116. Resistor 118 and capacitor 120 are selected to provide adequate load current and immunity from line ripple.

The voltage V1 appearing across terminals 108 and 110 is applied to an input filter and bias circuit 130 which provides a voltage V2 for a non-linear element 140 which provides a current I3 for a timer 150. The non-linear element controls the response of the timer 150 to the voltage V2, responsive to the magnitude of the voltage V2.

The timer 150 provides a control voltage or timing signal V3.

Means is provided for translating the magnitude of the timing signal V3 into signals for enabling and inhibiting certain functions of the elevator system 10. In this embodiment of the invention, the translating means includes a level detector 160 and a relay 170, with the level detector 160 providing a voltage V4 which picks up relay 170 when V4 is of one polarity, and which drops out relay 170 when V4 is of the opposite polarity.

More specifically, the input filter and bias circuit 130 includes a filter having a resistor 132 and a capacitor 134, with one side of resistor 132 being connected to terminal 108, and with the other side being connected to capacitor 134 at junction 136. The other side of capacitor 134 is connected to ground. Capacitor 134 has a relatively small value, selected to provide immunity to line transients and commutation notches, by enabling the power supply monitor 100 to ignore pulses in V1 which periodically can reduce V1 to zero for up to 600 microseconds, while remaining sensitive to single phasing of V1 and to losses in V1 for a predetermined period of time.

The bias portion of the circuit 130 is provided by a resistor 138 which is connected from junction 136 to the negative power supply terminal $-V$. The selected bias current controls the point at which the non-linear means 140 operates to modify the effect of the voltage V2 on the timer 150.

The voltage V2 appearing at terminal 136, which is the filtered and biased voltage V1, is applied to the non-linear means 140. The non-linear means 140 includes a resistor 142 and a diode 144 connected across resistor 142. The end of resistor 142 which is connected to the cathode of diode 144 is connected to junction 136 to receive the voltage V2, and its other junction provides a current I3 for the timer 150. When V2 is positive, the non-linear device presents an impedance to current flow equal to the resistance of resistor 142, and when V1 nears zero and V2 tends negative due to the bias, diode 144 becomes forward biased allowing current I3 to flow toward junction 136 while shunting resistor 142. Thus, the non-linear device 140 is non-linear with respect to the impedance it presents toward current flow therethrough in opposite directions.

The timer 150 in this embodiment includes an operational amplifier 152 which has its non-inverting input connected to ground and its inverting input connected to the non-linear means 140. The operational amplifier 152 is connected to provide an integrating function for integrating the current I3 by connecting a capacitor 156 between its output and the inverting input. A resistor 154 is connected in parallel with capacitor 156, and a diode 158 is connected to conduct current from the output of the operational amplifier to the inverting input. The diode 158 prevents the output from going more than about 0.6 volts positive, i.e., the drop across diode 158, as a more positive output would adversely affect the timing of the timer 150.

The non-linear means 140 controls the magnitude of the resistance in the charging, and discharging paths, of capacitor 156. When the current I3 flows toward the inverting input of operational amplifier 152, the rate at which capacitor 156 is charged is responsive to the magnitude of resistor 142, and when V1 drops near zero, the negative bias across resistor 138 forward biases diode 144, and resistor 142 is effectively removed from the discharge path. Thus, capacitor 156 discharges at a rate determined primarily by the magnitude of resistor 138. Thus, the non-linear means 140 controls the response of the timer 150 to the unidirectional signal V2, in response to the magnitude of V1 and thus V2. As long as the magnitude of V2 is high enough to reverse bias diode 144, the non-linear means allows capacitor 156 to charge and discharge at a first rate. When V2 drops to the point of forward biasing the diode 144, the non-linear means changes the rate, increasing it to a second rate at which capacitor 156 is more rapidly discharged.

The level detector 160 includes an operational amplifier 162 with positive feedback from its output to its non-inverting input via a resistor 164. The voltage V3 is applied to the non-inverting input of operational amplifier 162 via resistor 166, and the inverting input is connected to receive a predetermined reference voltage via resistors 168 and 169. Resistor 168 is connected from the negative source voltage $-V$ to the inverting input, and the inverting input is connected to ground via resistor 169. The positive feedback causes the operational amplifier 162 to operate as a bistable device with wide hysteresis in which the transition points from positive to negative output, and from negative to positive output, may be accurately preset by the selection of the values of the resistors.

The output voltage V4 of the level detector 160 is applied to the relay 170. Relay 170 includes an electromagnetic coil 172, a normally closed contact 174, and a normally open contact 176. Contact 174 is connected in the gate driver circuit 62 such that when it is closed, it inhibits the gate driver from providing firing signals, and when it is open, it removes the inhibit. Contact 176 is connected in the control 60, such as in the serially connected string of safety contacts of the safety circuits shown in FIG. 2 of the incorporated U.S. Pat. No. 3,741,348, all of which must be closed in order to complete a circuit through the safety relay and allow the elevator to run. Thus, if contact 176 is open, the elevator car 70 cannot run, and if it is running when this contact opens, the car will make an emergency stop in the same manner that it would for the operation of any other device in the safety circuit string of contacts. Diodes 178 and 179 are connected to cause relay 170 to pick up when the voltage V4 is negative and drop out when the voltage V4 is positive, by connecting the cathode of diode 178 to voltage V4 and its anode to one side of the electromagnetic coil 172. The other side of the coil 172 is grounded. Diode 179 has its anode connected to the anode of diode 178, and its cathode is connected to ground.

The operation of the power supply monitor 100 shown in FIG. 1 may best be explained by referring to the graphs shown in FIGS. 2 through 5. FIG. 2 illustrates the voltages V1, V2, V3 and V4 and the state of relay 170, using a first time scale as a reference. Initial startup of the elevator system is illustrated at T1. At this time relay 170 is deenergized, its contact 176 is open, preventing the elevator car from operating, and its contact 174 is closed, inhibiting the gate driver 62 from providing pulses. The voltage V1 rises to the rectified control voltage level, the voltage V2 rises to a level representative of V1 minus the negative bias, and the current I3 starts to increase from zero, flowing toward the inverting input of operational amplifier 152. The output voltage V3 of operational amplifier 152 starts to increase from zero in the negative direction along a ramp 200, the slope of which is responsive to the circuit which includes resistor 142 and capacitor 156. Current I3 is forced to flow through resistor 142, as diode 144 is reverse biased and blocking.

The input voltage V3 to the non-inverting input of operational amplifier 162 of the level detector is initially zero while the voltage on the inverting input is at a fixed negative reference value. Thus, the output voltage V4 of operational amplifier 162 is initially positive and relay 170 is deenergized.

The power supply monitor 100 monitors the power supply appearing on busses 36, 38 and 40, and will not allow the elevator system to go into operation until the three-phase source 34 or 35 has provided a three-phase voltage for a first predetermined period of time, for example 10 seconds, during which there are no interruptions which persist for a second predetermined period of time, for example 10 milliseconds. The first predetermined period of time is determined by the time it takes the voltage V3 to increase from zero to a first threshold level at which the level detector 160 switches from a positive to a negative output. The first threshold level is superimposed on voltage V3 in FIG. 2 as dotted line 202.

In the example shown in FIG. 2, an interruption in the three-phase source occurs at time T2 which persists for a period of time longer than 10 milliseconds to time T3. This interruption forward biases diode 144 and rapidly discharges capacitor 156, forcing voltage V3 rapidly to zero. Voltage V3 does not reach the first threshold level 202 and thus the elevator system is not allowed to become operational. When the three-phase source returns at time T3, voltage V3 again begins to increase negatively along ramp 204. No interruptions of the selected 10 millisecond duration are encountered during the selected 10 second time period indicated by arrow 206, and voltage V3 reaches the first threshold level 202 at point 205, which occurs at time T4. This level of voltage V3 causes the level detector output voltage V4 to abruptly change from a positive polarity to a negative polarity, and relay 170 is energized. Contact 176 closes to enable the safety circuits in control 60, contact 174 opens to remove the inhibit of the gate driver 62, and the elevator system is allowed to become operational. Operational amplifier 152 saturates at time T5, reaching its maximum negative output voltage.

An interruption in the three-phase source at time T6 which persists for 10 milliseconds or longer to time T7, rapidly drops the voltage V3 toward zero, crossing a second threshold level, indicated by dotted line 208, at point 209. This magnitude of voltage V3 switches output voltage V4 of the level detector 160 from a negative to a positive polarity, deenergizing relay 170. The elevator car 70 thus makes an emergency stop, if running, and the gate signals are inhibited, preventing any firing signals for at least 10 seconds, which is long enough to insure that the car has stopped and that there will be no firing of thyristors which might cause fuses to blow.

When the three-phase potential returns at time T7, the voltage V3 starts up a time ramp 210 but before reaching the first threshold level 202, an interruption in the three-phase source occurs at time T8 which persists for more than 10 milliseconds to time T9, dropping voltage V3 to zero. At time T9, the three-phase source returns and voltage V3 starts in a negative direction along timing ramp 212. Before the voltage V3 reaches the first threshold level 202, an interruption in the three-phase source again occurs at time T10 which persists for more than 10 milliseconds to time T11. Voltage V3 again drops to zero. When the three-phase source returns at time T11, the voltage V3 again starts in the negative direction along timing ramp 214, reaching the first threshold level 202 ten seconds later, indicated by arrow 216, intersecting the first threshold level at point 215. This causes the output V4 of the level detector 160 to switch from positive to negative and thus energize relay 170. The elevator car is then permitted to go back into service. Operational amplifier 152 saturates at time T13, reaching its maximum negative output voltage. An interruption in the three-phase source occurs at time T14 which persists for less than 10 milliseconds, V3 does not drop to the second threshold level 208, and thus this interruption has no affect on the elevator system.

Figure 3:
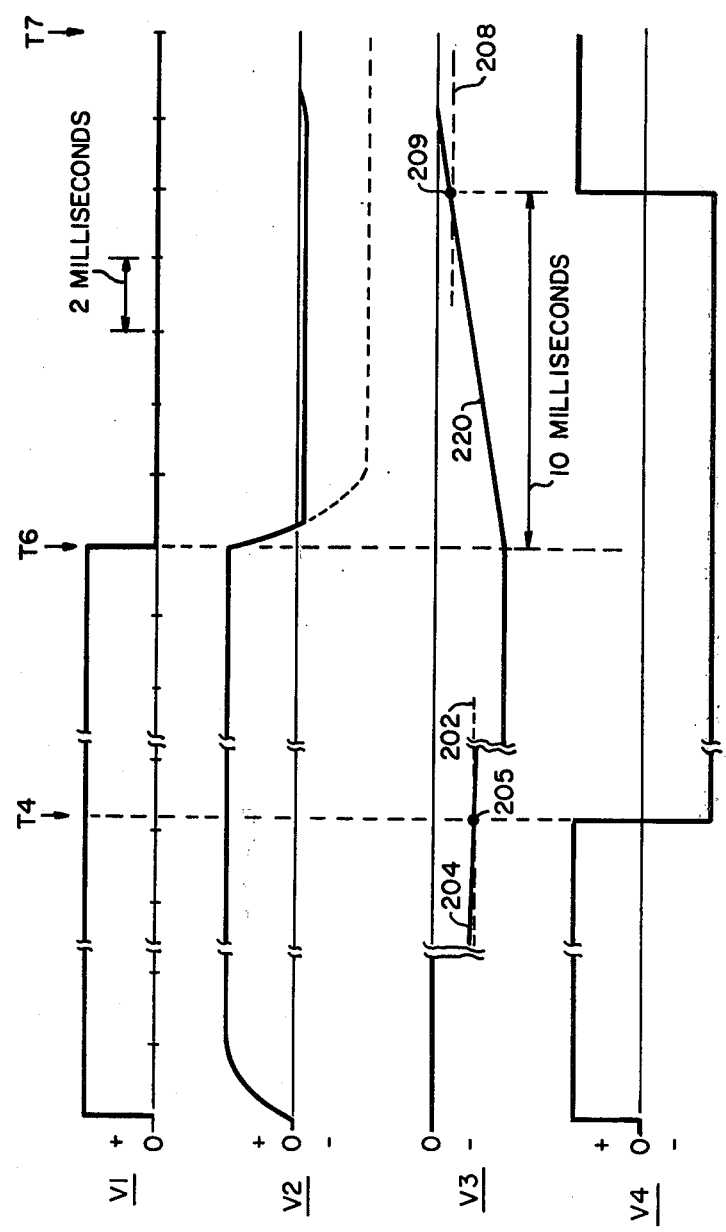

FIG. 3 illustrates fragments of the voltages V1, V2, V3 and V4 shown in FIG. 3, with a time scale which expands the distance between times T6 and T7, in order to more clearly illustrate the discharging time ramp 220 of V3 toward the second threshold lever 208.

FIG. 4 is a chart of voltages V1, V2, V3 and V4 which illustrates the immunity of the power supply monitor 100 from interruptions in the three-phase source which are not of sufficient duration to cause misfiring of the thyristors in the converter banks. This immunity is provided by the filter portion of circuit 100, causing voltage V2 to remain above zero, notwithstanding an interruption in the three-phase source, and thus in the unidirectional voltage V1. FIG. 4 illustrates that 600 microsecond interruptions in V1 with a period of 2800 microseconds will not start V3 along the 10 millisecond time ramp 220 shown in FIG. 3.

Figure 5:
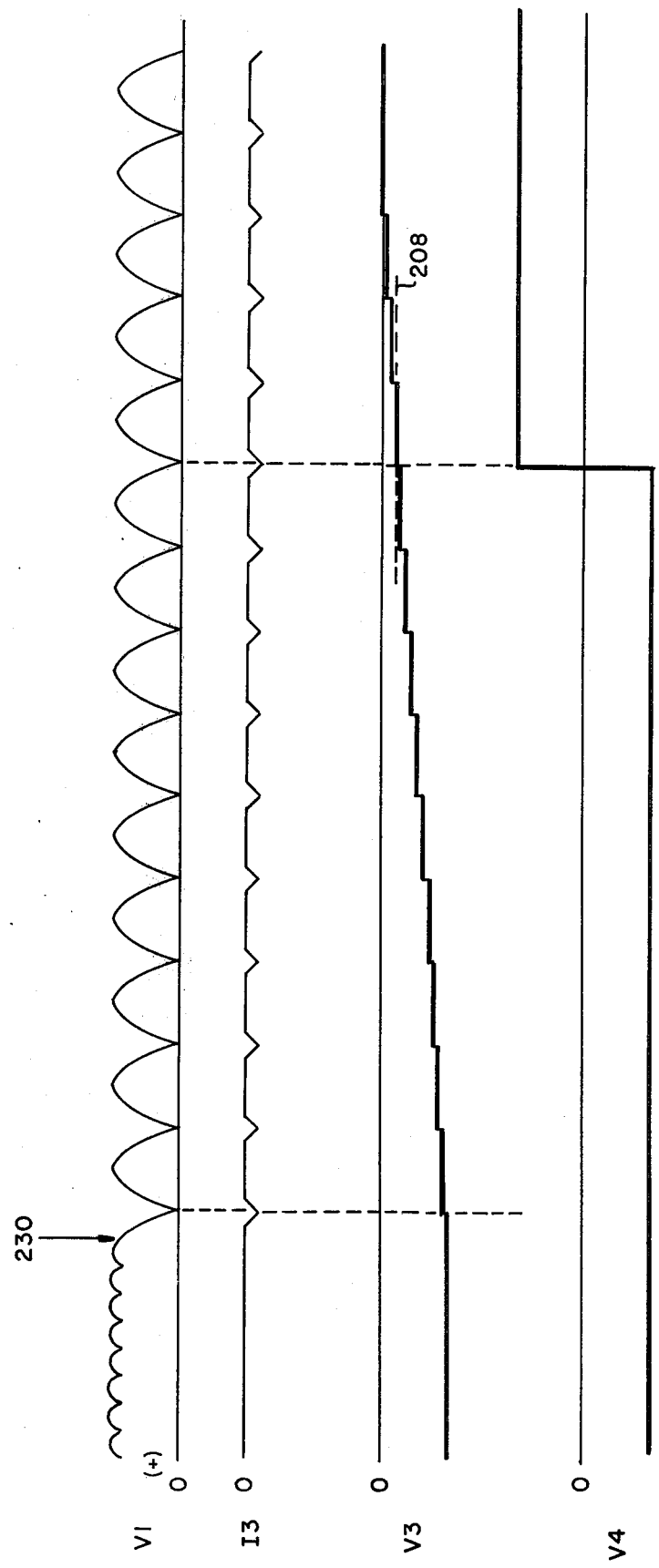

Distortion in the waveform of the three-phase source voltage which is not severe enough to start V3 along a ramp to the second threshold level 208 will not adversely affect the operation of the converter banks or the elevator system, and the power supply monitor 100 will not falsely shut the system down due to such distortion. The power supply monitor 100, however, is responsive to single phasing of the three-phase source, as the resulting waveform of voltage V1 is distorted to the point where V3 is quickly dropped to the second threshold level 208. FIG. 5 illustrates voltages V1, V3 and V4, and current I3 for a single phasing condition. The single phase rectified waveform of V1, which starts at arrow 230 as the three-phase source changes from a three-phase to a single phase output causes the area of the I3 envelope below the zero line to exceed the area of the I3 envelope above the zero line. The output voltage V3 of the integrating operational amplifier 152 is thus stepped progressively toward zero, reaching the second threshold level 208 in about 80 milliseconds, which causes voltage V4 to switch to its positive polarity and deenergize relay 170. The elevator system will be taken out of operation until the single phasing condition is corrected.

The embodiment of the invention shown in FIG. 1 is the preferred embodiment because of its flexibility and ease of adjustment in selecting the threshold levels and the bias level. However, instead of using solid state amplifiers, a power supply monitor may be constructed which is functionally similar to the power supply monitor 100 while using only resistors, capacitors, diodes and a sensitive relay. FIG. 6 is a schematic diagram of a power supply monitor 250 constructed according to a second embodiment of the invention. Power supply monitor 250 has input terminals referenced 108 and 110, the same as the input terminals of the power supply monitor 100 shown in FIG. 1, as each monitor is connected to receive a unidirectional signal responsive to the three-phase source. Relay 172 and its contacts 174 and 176 are also used in this embodiment of the invention, with contacts 174 and 176 being connected as described relative to the FIG. 1 embodiment.

The embodiment of the invention shown in FIG. 6 requires first and second resistors 252 and 254, respectively, first and second capacitors 256 and 258, respectively, a diode 260, a Zener diode 262, and a sensitive relay 172. The first resistor 252 and the first capacitor 256 are serially connected between terminals 108 and 110 to provide a first R-C circuit, with resistor 252 being connected to terminal 108 and capacitor 256 connected to terminal 110. The second resistor 254 and the second capacitor 258 are serially connected between terminals 108 and 110 to provide a second R-C circuit, with resistor 254 being connected to terminal 108 and capacitor 258 connected to terminal 110. Diode 260 is connected to conduct current from the junction 264 between resistor 254 and capacitor 258, to the junction 266 between resistor 252 and capacitor 256. Zener diode 262 and the electromagnetic coil 172 of relay 170 are serially connected across capacitor 258, with the cathode of the Zener diode 252 connected to junction 264 and the electromagnetic coil 172 connected to terminal 110.

In describing the operation of power supply monitor 250, the graph shown in FIG. 7 will be referred to. FIG. 7 illustrates the unidirectional voltage V1 which is responsive to the three-phase source 34 or 35, the voltage E1 which appears at junction 266, the voltage E2 which appears at junction 264, and the condition of relay 170.

Upon initial startup of the elevator system at time T1, the voltage V1 increases to the rectified equivalent of the three-phase source and capacitor 256 charges rapidly to the magnitude of the D.C. potential with a very short time constant, reverse biasing diode 260. Capacitor 258 also starts to charge but with a much longer time constant via resistor 254, which has a much larger magnitude than resistor 252. The voltage E2 across capacitor 258 increases along exponential 270, but before the voltage E2 reaches a first threshold level 274, the three-phase source is interrupted at time T2 for a period of time which exceeds a selected value, such as 10 milliseconds. Capacitor 256 rapidly discharges and diode 260 is forward biased, allowing capacitor 258 to rapidly discharge through the first resistor 252 and the relatively low source impedance. When the three-phase source returns at time T3, the voltage E1 quickly builds up and the voltage E2 starts up exponential 272. The Zener diode 262 breaks down at level 284 to conduct current in its reverse direction, and when the current magnitude reaches the pick-up point of relay 170, the first threshold 274 has been reached, which time may be selected to be 10 seconds, as in the first embodiment, or any other desired value. The elevator system is then permitted to become operational. An interruption in the three-phase source occurs at time T5 for a period of time which is less than the selected 10 milliseconds, capacitor 258 starts to discharge but the voltage E2 does not reach the second threshold level 280, and thus relay 170 does not drop out. The voltage E2 then rebuilds to its maximum value along ramp 278. At time T6 an interruption in the three-phase source occurs which persists for more than the selected 10 milliseconds to time T7, the voltage E2 drops rapidly to zero, passing through the second threshold level 280 at point 282, and relay 170 is deenergized, stopping the elevator car and inhibiting the production of firing signals for the converters.

The Zener diode 262 is indispensable, as it reduces the total circuit hysteresis, including the relay 170. The ratio of maximum to minimum pick-up times and the ratio of maximum to minimum drop-out times are improved by 30 and 50 percent, respectively, by adding the Zener diode. Also, the drop-out time is about 17 times greater for the circuit without the Zener diode. A very short drop-out time is essential.

In summary, there has been disclosed a new and improved elevator system which will operate reliably upon various supply voltage conditions, with the new and improved elevator system including a power supply monitor which detects a loss of one or more phases of an alternating supply voltage, it discriminates between true losses of voltage and line distortion which will not adversely affect the operation of the power supply or the elevator system, and upon detection of a loss of voltage for a predetermined period of time, the power supply monitor conditions the elevator drive control circuits to inhibit output and cause an emergency stop.

The elevator system will then not be allowed to become operational until approximately 10 seconds after the last significant line disturbance has been detected. Thus, the integrity of the A.C. supply lines is continuously checked and verified before the elevator is allowed to operate. When the power supply includes converter apparatus, the detection of a significant line disturbance will initiate the immediate inhibiting of firing signals. Thus, misfiring of the thyristors during unusual line voltage conditions is prevented.

We claim as our invention:

1. An elevator system, comprising:
an elevator car,
motive means for said elevator car,
power supply means for said motive means, including: a three-phase source of electrical potential,
first control means operable between first and second conditions responsive to first and second predetermined threshold levels, respectively, of an input signal applied thereto, said first control means enabling flow of energy from said power supply means to said motive means when in its first condition, and inhibiting such flow when in its second condition,
rectifier means providing a unidirectional signal responsive to said three-phase source,
second control means,
and timing means providing an input signal for said first control means in response to said unidirectional signal and said second control means, said second control means controlling the response to said timing means to said unidirectional signal in response to the magnitude of said unidirectional signal, such that when the first control means is in its second condition the input signal will maintain the second condition until said three-phase source has provided a three-phase potential for a first predetermined period of time during which there were no interruptions which exceeded a second predetermined period of time, with said first period of time being longer than said second period of time, and when the first control means is in its first condition the input signal will maintain the first condition until an interruption occurs which exceeds said second predetermined period of time.

2. The elevator system of claim 1 including bias means providing a predetermined bias signal, wherein the second control means modifies the response of the timing means to the unidirectional signal in response to the magnitude of the unidirectional signal and the magnitude of said bias signal.

3. The elevator system of claim 1 wherein the rectifier means includes filter means selected to provide an uninterrupted unidirectional signal notwithstanding an interruption in the three-phase source which persists for less than a third predetermined period of time, with the second control means enabling the timing means to provide an input signal for the first control means in response to the unidirectional signal which maintains the first condition of the first control means.

4. The elevator system of claim 1 wherein the second control means responds to single phasing of the three-phase source by controlling the timing means to reduce the magnitude of the timing signal upon each half cycle of the unidirectional signal provided by the rectifier means in response to the output of the three-phase source, causing the timing signal to decrease to the second threshold level after a predetermined number of such half-cycles and operate the first control means to a second condition.

5. An elevator system, comprising:
an elevator car,
motive means for said elevator car,
power supply means for said motive means, including a three-phase source of electrical potential,
first control means operable between first and second conditions responsive to first and second predetermined threshold levels, respectively, of an input signal applied thereto, said first control means enabling flow of energy from said power supply means to said motive means when in its first condition, and inhibiting such flow when in its second condition,
rectifier means providing a unidirectional signal responsive to said three-phase source,
second control means,
and timing means providing an input signal for said first control means in response to said unidirectional signal and said second control means, said second control means controlling the response of said timing means to said unidirectional signal in response to the magnitude of said unidirectional signal, such that when the first control means is in its second condition the input signal will maintain the second condition until said three-phase source has provided a three-phase potential for a first predetermined period of time during which there were no interruptions which exceeded a second predetermined period of time, and when the first control means is in its first condition the input signal will maintain the first condition until an interruption occurs which exceeds said second predetermined period of time, said timing means including a capacitor which is charged and discharged at a first rate in response to the unidirectional signal, with said second control means causing said capacitor to discharge at a second rate which exceeds the first rate for that period of time that the unidirectional signal is below a predetermined magnitude, and with the input signal for the first control means provided by the timing means being responsive to the charge on said capacitor.

6. An elevator system, comprising:
an elevator car,
motive means for said elevator car,
power supply means for said motive means, including a three-phase source of electrical potential,
first control means operable between first and second conditions responsive to first and second predetermined threshold levels, respectively, of an input signal applied thereto, said first control means enabling flow of energy from said power supply means to said motive means when in its first condition, and inhibiting such flow when in its second condition,
rectifier means providing a unidirectional signal responsive to said three-phase source,
second control means,
timing means providing an input signal for said first control means in response to said unidirectional signal and said second control means, said second control means controlling the response of said timing means to said unidirectional signal in response to the magnitude of said unidirectional signal, such that when the first control means is in its second condition the input signal will maintain the second condition until said three-phase source has provided a three-phase potential for a first predetermined period of time during which there were no interruptions which exceeded a second predetermined period of time, and when the first control means is in its first condition the input signal will maintain the first condition until an interruption occurs which exceeds said second predetermined period of time, and bias means connected to modify the magnitude of the unidirectional signal, said timing means including a capacitor which is charged and discharged at a first rate in response to the unidirectional signal, with the second control means causing said capacitor to discharge at a second rate which exceeds the first rate for that period of time the modified unidirectional signal is below a predetermined magnitude, and with the input signal for the first control means provided by the timing means being responsive to the charge on said capacitor.

7. The elevator system of claim 1 wherein the power supply means includes bridge rectifier means having controllable rectifier devices, and third control means providing firing signals for said rectifier devices, and wherein the motive means includes a direct current motor connected to said bridge rectifier means, and wherein the first control means inhibits said third control means from providing firing signals for said bridge rectifier means when it is in its second condition.

8. An elevator system, comprising:
an elevator car mounted for movement in a structure having a plurality of floors,
motive means for moving said elevator car to serve the floors,
power supply means for said motive means including a three-phase source of electrical potential,
translating means having an input and an output, with said output being operable between first and second conditions responsive to first and second predetermined threshold levels of a signal applied to its input, said translating means enabling flow of energy from said power supply means to said motive means when its output is in the first condition and inhibiting such flow when its output is in its second condition,
rectifier means providing a unidirectional signal responsive to said three-phase source,
timing means responsive to said unidirectional signal, said timing means providing a timing signal for the input of said translating means,
means responsive to the magnitude of said unidirectional signal for controlling the time required for the timing signal provided by said timing means to increase and decrease to said first and second threshold levels upon predetermined increases and decreases, respectively, in the magnitude of said unidirectional signal, with the time required for said timing signal to decrease to the second threshold level following a predetermined decrease in the unidirectional signal being shorter than the time for said timing signal to increase to the first threshold level after a like increase in the magnitude of the unidirectional signal, with the relationship between these two different times being selected to cause said translating means to maintain its second condition until said three-phase source has provided a three-phase potential for a first predetermined period of time during which there were no interruptions which exceeded a second period of time, and to maintain its second condition until an interruption occurs which exceeds said second predetermined period of time.

9. The elevator system of claim 8 wherein the relationship between the two different times is additionally selected to cause single phasing of the three-phase source to reduce the magnitude of the timing signal to a second threshold level after a predetermined number of half cycles of the single phase source.

10. The elevator system of claim 8 wherein the means responsive to the magnitude of the unidirectional signal includes bias means connected to bias the unidirectional signal to select the desired relationship between the two different times.

11. An elevator system, comprising:
an elevator car mounted for movement in a structure having a plurality of floors,
motive means for moving said elevator car to serve the floors,
power supply means for said motive means including a source of three-phase electrical potential,
monitoring means responsive to said source of three-phase electrical potential for preventing flow of energy from said power supply means to said motive means upon an interruption in said source of three-phase electrical potential which exceeds a predetermined short period of time, and upon single phasing of said source of three-phase electrical potential,
said monitoring means including rectifier means, timing means, non-linear means, and translating means,
said rectifier means providing a unidirectional signal responsive to the source of three-phase electrical potential,
said timing means providing a timing signal having a magnitude responsive to the magnitude of said unidirectional signal, with the rate at which said timing signal is changed in response to a change in the magnitude of said unidirectional signal being selected by said non-linear means in response to the magnitude of said unidirectional signal,
said translating means being responsive to said timing signal, preventing flow of energy from said power supply means to said motive means when the timing signal is below a first predetermined magnitude.

12. The elevator system of claim 11 wherein the translating means enables flow of energy from the power supply means to the motive means when the timing signal exceeds a second predetermined magnitude.

13. The elevator system of claim 12 wherein the non-linear means selects the rates at which the timing signal may be changed such that the timing signal will exceed the second predetermined magnitude only after the source of three-phase electrical potential has provided a three-phase electrical potential for a first predetermined period of time following the last interruption which exceeded the predetermined short period of time.

14. The elevator system of claim 11 wherein the rectifier means includes filter means selected to provide a unidirectional signal for the timer means which enables the timer means to effectively ignore interruptions in the source of three-phase electrical potential which persists for less than a predetermined period of time.

15. The elevator system of claim 11 including bias means connected to the rectifier means, wherein the timing means includes integrator means including a capacitor, with the non-linear means controlling the current appearing at the input of said integrator means such that the charge on said capacitor decreases more rapidly than it increases when the unidirectional signal is below a predetermined magnitude, and wherein the timing signal is the output of said integrator means.

16. The elevator system of claim 11 including bias means connected to the rectifier means, and wherein the timing means includes a capacitor which is charged by current responsive to said rectifier means and said bias means, said non-linear means causing said capacitor to discharge at a faster rate than said charging rate when the unidirectional signal drops below a predetermined magnitude, and wherein the timing signal is responsive to the charge on said capacitor.

17. The elevator system of claim 11 wherein the translating means includes level detector means which has a first ouput state when the timing signal is below the first predetermined magnitude, and a second output state when the timing signal is above a second predetermined magnitude which exceeds the first predetermined magnitude, with the first output state preventing flow of energy from the power supply means to the motive means, and with the second output state enabling such flow.

18. The elevator system of claim 11 wherein the power supply means includes bridge rectifier means having controllable rectifier devices, control means for providing firing pulses for said controllable rectifier devices, and wherein the motive means includes a direct current motor connected to said bridge rectifier means, and wherein the translating means inhibits said control means from providing firing signals when the timing signal is below the first predetermined magnitude.

19. The elevator system of claim 11 wherein the non-linear means provides a current magnitude responsive to the unidirectional signal, the timing means includes a capacitor which integrates the current provided by the non-linear means, and the non-linear means controls the charging and discharging rate of said capacitor, discharging said capacitor at a rate which exceeds the charging rate when the unidirectional signal falls below a predetermined magnitude.

20. The elevator system of claim 11 wherein the timing means includes first and second R-C circuits, with the non-linear means selecting said second R-C circuit in response to an increasing unidirectional signal which charges the capacitor of the second R-C circuit at a predetermined rate, and a combination of said first and second R-C circuits in response to a decreasing unidirectional signal, which discharges the capacitor of the second R-C circuit more rapidly than the charging rate, said capacitor of the second R-C circuit providing the timing signal.

21. The elevator system of claim 20 wherein the translating means includes a Zener diode and an electromagnetic relay.

* * * * *